March 18, 1952 C. W. EARP 2,589,236

RADIO DIRECTION FINDING SYSTEM

Filed Aug. 11, 1945 3 Sheets-Sheet 1

Inventor
CHARLES WILLIAM EARP
By

Attorney

March 18, 1952 C. W. EARP 2,589,236

RADIO DIRECTION FINDING SYSTEM

Filed Aug. 11, 1945 3 Sheets-Sheet 2

Inventor
CHARLES WILLIAM EARP
By E D Phinney
Attorney

March 18, 1952 C. W. EARP 2,589,236

RADIO DIRECTION FINDING SYSTEM

Filed Aug. 11, 1945 3 Sheets-Sheet 3

Inventor
CHARLES WILLIAM EARP
By E. D. Phinney
Attorney

Patented Mar. 18, 1952 2,589,236

UNITED STATES PATENT OFFICE 2,589,236

RADIO DIRECTION FINDING SYSTEM

Charles William Earp, Aldwych, London, England, assignor, by mesne assignments, to International Standard Electric Corporation, New York, N. Y., a corporation of Delaware Application August 11, 1945, Serial No. 610,357
In Great Britain August 15, 1944

4 Claims. (Cl. 343—121)

The present invention relates to radio direction finding systems and it has for its object to provide such systems in which frequency or phase modulation reception technique may be employed at the receiver.

Among the advantages of utilising frequency or phase modulation reception technique are the following:

(1) When two frequency or phase modulated waves are received simultaneously, the action of the amplitude limiter in a frequency or phase modulation receiver is to eliminate the weaker of the two waves, resulting in the measurement of the bearing as indicated by the stronger wave without error due to the presence of the weaker wave.

(2) Initial amplitude modulation of the signal, for example by speech, has no effect upon the output of the direction finding circuits.

(3) The phase modulation applied to the radio direction finding circuits is not detected by an amplitude modulation receiver, and the latter can therefore be used to detect any amplitude modulation of the received waves while the direction finding circuits are in operation without interference or distortion due to the phase modulation.

According to a broad aspect of the present invention a radio direction finding system is characterised in this that the receiver for receiving the electromagnetic waves from the transmitting aerial system comprises a frequency or phase modulation receiver.

According to another aspect of the invention, a radio direction finding system is characterised in this that frequency or phase modulation reception technique is used at the receiver and also that the frequency or phase modulation of the received waves is set up at the receiver and a characteristic of the modulation is indicative of the direction of reception of the received waves.

In carrying out the invention the receiving antenna system comprises directive and non-directive antenna systems, the outputs of which are so combined as to produce frequency or phase modulated signals a characteristic of which is indicative of the direction of reception of the received waves. To this end the received waves from the directional and non-directional antenna systems are combined in phase quadrature and the phase modulation cycle is compared with the phase of a comparison wave to produce the direction finding information required.

The transmitted waves are received on a directional antenna and on an omnidirectional antenna, the amplitude of the output of the directional antenna depending upon the angular relation between the directional pattern of the antenna and the direction of propagation of the received waves. The output from the directional antenna is modulated by a single low frequency for example in a balanced modulator so that the output comprises only the sidebands. These sidebands are then combined with the received waves from the sense or omnidirectional antenna in quadrature phases to provide a phase modulated wave, whose modulation magnitude depends upon the amplitude of the wave received by the directional antenna. The E. M. F. in the directional aerial such as a loop or differentially connected pair of omnidirectional aerials is in phase quadrature with the E. M. F. from the sense antenna so that the modulated output from the directional antenna and the omnidirectional antenna may be combined directly. The combined waves are then applied to a frequency or phase modulation demodulator to obtain a wave corresponding to the phase modulation, which may then be utilised to obtain the desired indication.

An embodiment of the invention comprises the "switched cardioid" type of direction finder as described in the British patent specification No. 484,590 with a slight modification. In that specification as described the signal from a loop aerial or the differential signal from a pair of spaced aerials is subjected to balanced modulation or switching at a low frequency before combination in phase or antiphase with the signal from the omnidirectional antenna or sense aerial, and as the signal E. M. F.'s, in the two aerial systems are in phase quadrature, it is necessary to subject the signals to a differential phase shift of 90 degrees. The output of such a system is an amplitude modulation of the sense signal. The strength and sense of the envelope of the modulated sense signal is used to deduce the bearing and sense of the received signal. The modification required by the present invention is the omission of the differential phase shift to the signals from the two antenna systems, and to combine the modulated output from the loop aerial directly with the output from the omnidirectional or sense aerial. The combined signal is then demodulated in a frequency or phase modulation demodulator by the frequency discriminator and not by the usual amplitude detector.

Another embodiment of the invention comprises a slight modification of the automatic direction finder described in the British patent specification No. 490,940. If the automatic direction finder described in the said specification No. 490,940 the signals from the two aerial systems of figure-of-eight directive patterns are modulated separately by different low frequencies. These modulated signals are combined with the wave from an omnidirectional antenna after a 90 degree phase shift, and the combined signals demodulated in an amplitude modulation detector. The direction of propagation of the received waves is deduced from the amplitude modulation envelope of the combined waves. The modification required by the present invention is the omission of the 90 degree phase shift introduced into the signal from the omnidirectional antenna. The modulated outputs from the directional antenna and the omnidirectional antenna are combined directly since the phases of the outputs of these antennae are in phase quadrature already. The combined signal bears a considerable phase modulation and is subjected to the action of an amplitude limiter after which it is demodulated by a frequency discriminator to yield a pair of low frequencies, the relative strengths and sense of phases of which serve to indicate the direction of propagation of the received waves. In this system equipment errors are minimised by accurate relative phasing of the waves received from the directional and omnidirectional antenna systems. Incorrect phasing produces a reduced amplitude of the demodulated signal so that spurious signal can produce greater errors. It will be observed that in an equipment which must cover a wide range of frequencies, the problem of adding together signals without relative phase control is easier to maintain with a given standard of precision, than for the case of 90 degrees relative phase control.

It will be noted that in the direction finders described in the previously mentioned patent specifications, the low frequency envelope of the combined modulated and unmodulated waves is in phase or anti-phase with the low frequency wave which is used to modulate the waves from the directional antenna. In the system embodying the present invention the low frequency phase modulation of the combined modulated and unmodulated waves is in phase or antiphase with the low frequency wave which is used to modulate the waves from the directional antenna system. The application of the phase modulated signal to a frequency discriminator provides a low frequency output which is in phase with the corresponding frequency modulation, that is, in quadrature phase with the phase modulation.

As most "course" indicators or indicators for indicating the angle of propagation of the received waves, or bearing of the receiver location by comparing receiver output with the low frequency modulating wave, it will be necessary in the systems embodying the present invention, to introduce into one of the waves, that is, the low frequency envelope of the combined waves or the low frequency modulating wave, a 90 degree phase shift, and preferably to the modulating wave applied to the indicator or comparison equipment which may conveniently take the form of a cathode ray tube oscillograph. This phase adjustment is of course, quite independent of the radio frequency to which the equipment may be adjusted.

The efficient operation of the embodiments hereinbefore referred to will depend upon the successful demodulation of the received waves which bear a relatively small phase or frequency modulation as compared with the normal conception of phase or frequency modulation systems established in the field of communication. The particular problem of the embodiments of the present invention is to demodulate received waves of small phase excursion with good signal to noise ratio, and without any ambiguity of sense of modulation.

It is of great importance in a radio direction finding system that the sense of bearing, and hence the sense of modulation of the received waves shall not be ambiguous. The normal frequency discriminator or demodulator depends upon the use of a double-path filter network, the rectified outputs from which are subtracted to give an output which varies linearly with respect to the frequency of the received waves. This means, inevitably, that there are two response bands of frequency at least, and usually three, over which there is a variable amplitude response with frequency, and inevitably there is at least one incorrect band of frequency in which the slope of the amplitude/frequency response curve is of opposite sense to the required response. As, now, on tuning the receiver, a required frequency can be selected at any point on the whole of the response curve, it is not possible to avoid an apparent inversion of sense of modulation at some point on the tuning scale. As in a phase modulation direction finding system such false tuning could give an inverted sense of bearing, it is of vital importance that such a condition shall be avoided.

This difficulty can be avoided in the following manner.

First, the received waves may be subjected to the action of a limiter, in order that spurious amplitude modulation is eliminated.

Secondly, (preferably after frequency changing the signal to a comparatively low intermediate frequency) the received or intermediate frequency waves may be applied to the action of a frequency multiplier, which may be of the simple harmonic generator type, or may be of the type in which the signal currents are used to synchronise an oscillator or an exact harmonic of the signal frequency currents. The effect of frequency multiplying is to increase the frequency and phase excursion of the received waves to a value which may be more easily demodulated. Demodulation is, of course, simplified by frequency changing to a comparatively low mean frequency, but excessive frequency multiplying and "beating down" again may lead to some difficulty with regard to tuning selection and frequency stability of the receiver.

Thirdly, and probably most important, a system of demodulation should be employed which avoids all ambiguity with regard to correct tuning, and sense of phase of the demodulated signal.

According to a feature of the invention this ambiguity of tuning is avoided by arranging a third filter path to a third detector (that is, additional to the normal two paths and respective detectors in a frequency or phase discriminator circuit, the pass band of this third filter path being centred on the operating frequency, and having a pass band smaller than the receiver circuits as a whole. The normal discriminator detectors receive maximum signal drive at frequencies above and below the "correct" or operating frequency.

The function of the third detector is to rectify correctly tuned signals, and to apply a control to remove a blocking bias from the low frequency circuits which follow the normal discriminator. Thus, until the receiver is correctly tuned, no low frequency output can be obtained, so that low frequency output of inverted phase due to mis-tuning can never appear.

The invention will now be further explained and made clearer in the following description taken in conjunction with the accompanying drawings in which.

Figure 1:
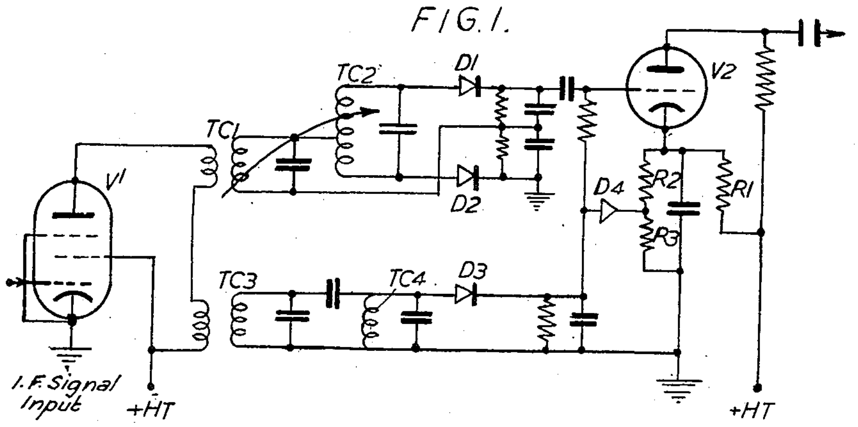
Figure 1 shows diagrammatically the circuit of the frequency or phase discriminator employed in embodiments of the present invention, which avoids ambiguity of tuning and sense of phase of the demodulated signal.

In Fig. 1, VI is an amplitude limiter valve normally present in a phase or frequency modulation receiver, and is fed from the intermediate frequency circuits of the receiver. The normal frequency or phase discriminator comprises tuned circuits TC1 and TC2, and D1, D2 represent the normal discriminator rectifiers.

Tuned circuits TC3 and TC4 which form the third path of the discriminator according to a feature of this invention are also fed from V1, and provide a filter of mean frequency equal to the correct intermediate frequency and pass band rather less than the receiver pass band. D3 is a rectifier which rectifies the output of TC3 and TC4 to apply a positive bias to the L. F. amplifier valve V2. When no waves are received, or when the receiver is incorrectly tuned, the positive bias applied by potentiometer e. g. by R1, R2, R3 from H. T.+ to the cathode of V2 renders V2 inoperative, but correct tuning causes D3 to raise the grid potential of V2 to start correct amplification. D4 is a rectifier used as a "catching" rectifier which prevents the valve V2 from being biassed incorrectly by a strong signal.

Figure 2:
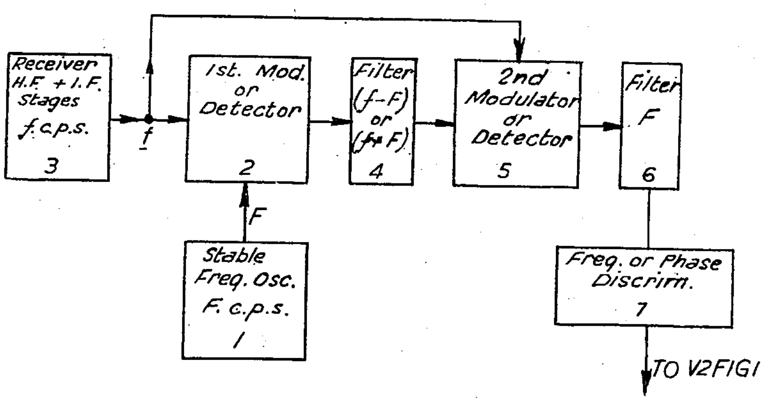
Figure 2 shows diagrammatically an alternative form of discriminator.

In the alternative form of frequency or phase discriminator illustrated in Figure 2, for sensitive demodulation and also for preventing incorrect tuning of the receiver, the intermediate frequency waves from the output of the intermediate frequency stages of the receiver are fed to two paths having a differential delay, a frequency changing stage being employed in one of the paths. The outputs from the two paths are combined in a second frequency changer stage which provides an output of constant mean frequency and of frequency excursion up to twice the frequency excursion of the original intermediate frequency waves. Final frequency demodulation is carried out on the said constant mean frequency in the output of the second frequency changer stage.

In Figure 2 of the drawings block 1 represents a constant frequency oscillation generator of known type, for example, a crystal controlled generator, giving in its output frequency F cycles per second. Block 2 represents a modulator or detector stage to which is fed the phase modulated intermediate frequency wave from an amplitude limiter at frequency $f$. The high frequency, intermediate frequency stages and amplitude limiter are represented by block 3. The stage 2 gives in its output the frequencies $(f+F)$ and $(f-F)$ which are fed to a filter represented by block 4 and which either passes frequency $(f+F)$ or $(f-F)$ to the second modulator or detector stage represented by block 5, which is also fed directly with frequency $f$ from the amplitude limiter 3. The second modulator or detector 5 gives in its output, sum and difference frequencies among which is either $(f-F)-f=-F$ when filter 4 passes $(f-F)$ or $(f+F)-f=F$ when filter 4 passes $(f+F)$. Frequency F in the output of the second modulator 5 is selected and passed by filter represented by block 6.

It should be noted that filter 4 should pass one side band only, either $(f-F)$ or $(f+F)$, for the sense of phase modulation of the output from the second modulator 5 at frequency F depends upon which sideband is selected. If both sidebands were passed by 4 the modulated frequencies F and −F would cause mutual interference and deep amplitude modulation.

The output at frequency F from filter 6 is fed to the frequency discriminator or phase demodulator represented by block 7 which yields a low frequency wave corresponding to the frequency or phase modulation of the output from the amplitude limiter 3.

It will be observed that the waves in the output of the amplitude limiter 3 are divided into two portions, one fed directly to the second modulator 5 and the other via the first modulator and filter 2, 4, to the second modulator 5. These two paths have a differential delay or transit time. The frequency is displaced in the path 2—4 by a constant amount and recombination of the waves from the two paths in the modulator or detector stage 5 provides in the output thereof a phase modulated wave of constant mean frequency which is demodulated by the normal type of phase demodulator or frequency discriminator represented by block 7, for example TC1, TC2, D1—D2 and V2 of Figure 1.

Figure 3:
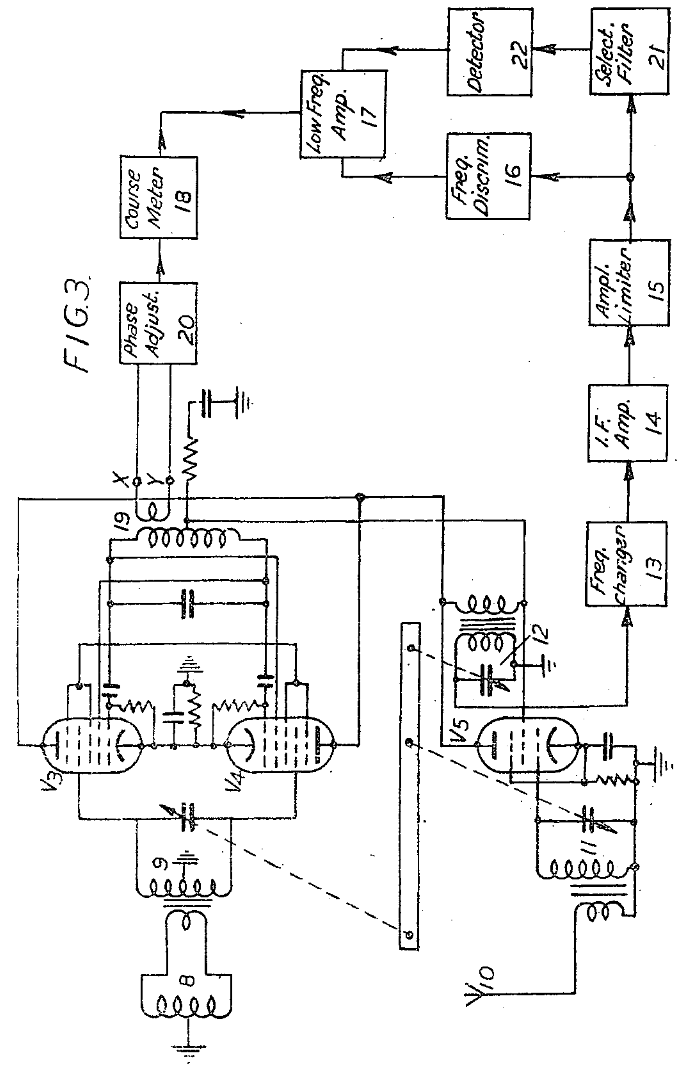
Figure 3 shows the circuit arrangement of the direction finder described in British specification No. 484,590 modified in accordance with the present invention.

Referring now to complete direction finding systems, Fig. 3 shows a practical arrangement in British patent specification No. 484,590 modified in accordance with the present invention.

In Fig. 3 a centre-grounded loop aerial 8 is tuned by a tightly coupled centre-grounded tuned circuit 9 to give two equal but anti-phase signal voltages between the condenser terminals and earth. As in the British specification No. 484,590, the heptode valves V3, V4 are used to amplify the received waves, and to switch said waves alternately through the two valves at a low frequency to the common anode circuit. The low frequency oscillation is produced at the inner electrodes of the heptodes, hence switching the electron streams of the two valves, and also giving a low frequency output voltage at terminals X, Y.

A vertical omni-directional aerial 10 is also tuned by a tightly coupled transformer 11, and the output is amplified by V5. The anode of V5 is directly coupled to the anodes of V3, V4 thereby combining the amplified vertical or sense signal with the switched loop signal in a different phase relationship than that which was arranged as described in British specification No. 484,590. In the present case, as the original E. M. F.'s from the loop and vertical aerial are in phase quadrature, and as the two sets of waves undergo equal treatment in the circuit (apart from phase reversal switching of the loop), the voltages due to the waves from the loop 8 and sense aerial 10 in the common anode circuit of V3, V4, V5 are always in quadrature phase.

As described in the aforesaid British specification No. 484,590 the effect of the switched waves was to provide an amplitude modulated sense signal. In the present case, the switched waves provide a phase modulated sense signal. When the amplitude of the waves from loop aerial 8 is not very large compared with amplitude of the waves from the sense aerial 10, little amplitude modulation appears on the combined signal in the common anode circuit of V3, V4 and V5.

Continuing with Fig. 3, the combined signal is transferred by tuned transformer 12 to undergo a frequency change in frequency changer stage represented by block 13 and intermediate frequency amplification in intermediate frequency amplifier represented by block 14 and limitation in amplitude in the limiter stage represented by block 15.

The portion of the output from 15 is fed to a frequency discriminator or demodulator represented by block 16 and the resultant low frequency output is fed through the controlled low frequency amplifier represented by block 17 to the course meter represented by block 18, to which, also, is fed switching oscillation output from V3, V4 via the transformer 19 and phase adjusting network represented by block 20.

Another portion of the output from 15 is fed to a selective filter represented by block 21 the output of which feeds a detector represented by block 22 which is arranged to unblock the low frequency amplifier 17 when signals pass through the selective filter 21.

In an equipment of the type described in relation to Figure 3, the phase adjustment required by phase adjustor 20 will be about 90°, for unless the receiver circuits (particularly in 14) impose a considerable delay or transit time, as frequency discriminator 16 gives a low frequency output in quadrature with the phase modulation, this output will be in quadrature, also, with the voltage across transformer 19 from the switching oscillator. The course meter usually employed requires currents which are in-phase or anti-phase so that phase adjustment before comparison becomes necessary.

Figure 4:
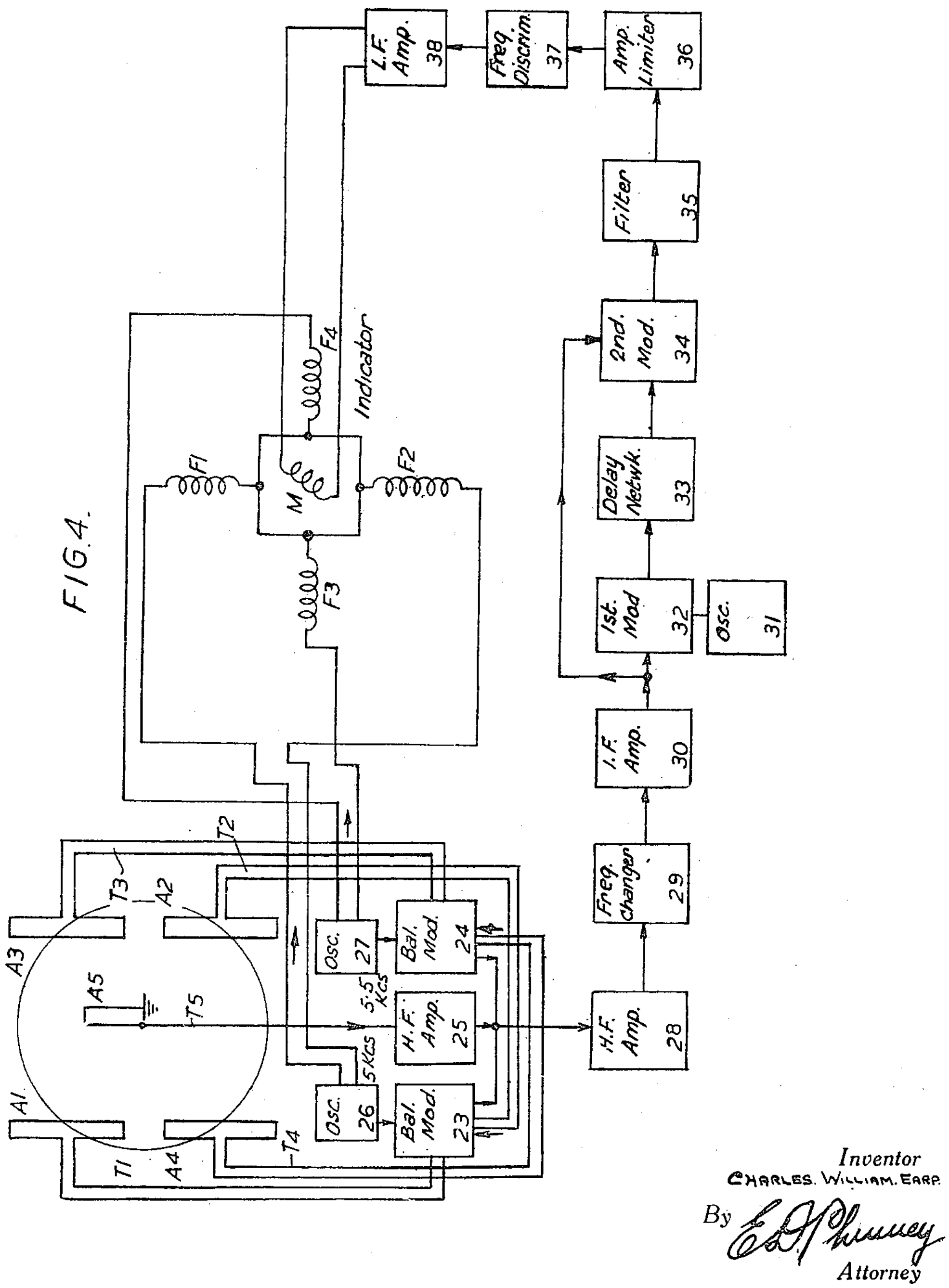
Figure 4 shows the circuit arrangement of the direction finder described in British specification No. 490,940 modified in accordance with the present invention.

Fig. 4 illustrates an arrangement embodying the present invention namely an automatic radio compass of the type described in British specication No. 490,940. In particular, it describes a system specially suitable for automatic direction finding over a frequency band of about 75 mc./sec. to 150 mc./sec.

Four folded dipoles A1, A2, A3, A4 of broad-band frequency characteristics are arranged at the corners of a square of diagonal about $\lambda/3$ for the shortest wavelength $\lambda$. At the centre of the square is a folded monopole A5 of similar band-pass and phase characteristic as the dipoles A1—A4.

One diagonal pair of aerials, namely A1 and A2 are connected in phase opposition through equal lengths of line T1, T2 preferably quarter wavelength long for mid-band frequency, to balanced modulator represented by block 23. The other diagonal pair A2, A4 are similarly connected to balanced modulator represented by block 24 through lines T3 and T4 equal in length.

The sense aerial A5 is connected through a fifth line T5 to a high frequency amplifier represented by block 25.

The balanced modulators 23, 24 and also the amplifier 25 are preferably of the grounded grid-type, suitable for connection to very low impedance broad-band sources. The modulators 23, 24 have their grids grounded for signal frequency potentials, but modulation voltages at about 5 kc./sec. and 5.5 kc./sec. are applied at these grids, in push-pull, from oscillators represented by blocks 26 and 27 respectively. In all cases, signal potentials are applied to the cathode. All five anodes (i. e. anode of 25, two anodes for 23, and two anodes for 24) are connected in parallel, and the common output is applied to feed a frequency or phase modulation receiver.

The essential part of the present invention is that waves received by the five aerials A1—A5 are combined to provide a total output which is a carrier wave corresponding to the pick-up of the sense aerial A5, this carrier being phase modulated at 5 kc./sec. and at 5.5 kc./sec. according to the differential signals picked up in the two pairs of "diagonal" aerials A1, A2, and A3, A4. This type of combined signal is produced (instead of the amplitude modulated signal as in the arrangement described in British specification 490,940) owing to the fact that all five aerials are connected through transmission lines T1, T5 of equal electrical length.

In the arrangement described in British specification No. 490,940 it was necessary to connect the sense aerial A5 through a line of electrical length differing from the others by 90°. The fact that a fixed line could be a quarter wavelength long for only one frequency caused a considerable limitation to be imposed on the total wave-coverage of the complete system. In the present arrangement no such limitation is imposed, so that the total frequency band of the system described in British specification No. 490,940 can be covered with good phasing.

The combined signals from 23, 24 and 25 are amplified, in the high frequency amplifier represented by block 28, changed in frequency to a fixed I. F. of 10 mc./sec. in the frequency changing stage represented by block 29 and amplified further in the intermediate frequency amplifier represented by block 30. The output from 30 is split into two paths.

Oscillator represented by block 31 at 1 mc./sec. changes the frequency in the first modulator represented by block 32 in one path to 9 mc./sec. and delay network represented by block 33 imposes a delay which is preferably equal to about one half period of the modulation frequencies, say 100 $\mu$/secs.

Output from 33 is combined in the second modulator represented by block 34 with some of the original 10 mc./sec waves from 30 to produce an output of mean frequency equal to 1 mc./sec. As explained in relation to Figure 2 the value of delay imposed by 33 causes the 1 mc./sec. waves to have a frequency excursion equal to twice the amount of the frequency excursion of the 10 mc./sec. waves.

After filtering in filter represented by block 35 limitation in amplitude limiter represented by block 36 and frequency demodulation in discriminator represented by block 37, the low frequency waves in the output of 37 comprise two tones, of 5 kc./sec. and 5.5 kc./sec. of amplitudes and senses of phase according to the strengths and senses of H. F. signals in the diagonal pairs of aerials A1, A2 and A3, A4. These low frequency waves are amplified in the low frequency amplifier represented by block 38.

British specification No. 490,940 describes how the receiver output from 38 and the modulating oscillator outputs from 26 and 27 may be used to provide an automatic display of the signal bearing. For this purpose, it is usually necessary to have oscillator outputs from 26 and 27 which are in phase or anti-phase with the corresponding frequencies in the output from 38, and phase control of the outputs from 26 and 27 will usually be necessary. Owing to the transit time of a signal through the receiver 28—38, however, the fact that the frequency discriminator 37 gives an output in phase quadrature with the phase modulation of the waves applied to it does not necessarily imply that the frequencies in the output of 38 are in phase quadrature with the outputs 26, 27. If, for example, the transit time of the signal through the receiver is about 50 $\mu$/sec. (or 150 $\mu$/sec. via 33) then the phase at the output of 38 will automatically be the same as in 26 and 27.

In Figure 4 a dynamometer type of instrument is indicated, and as shown diagrammatically the outputs from 26 and 27 are applied in push-pull to two crossed field coils, each of which is shown in two halves, designated F1, F2 and F3, F4 respectively and the output from 38 is applied to the moving coil M.

Whilst a dynamometer type of instrument is indicated, it will be clear to those versed in the art that other types of indicating instruments may be employed. For example, the output from 38 may be applied to two differential detector combinations to which are also applied respectively waves from the oscillators 26 and 27. Such detector combinations may give unidirectional voltage outputs characteristic of the bearing, which voltage outputs may be applied to give a radial line trace on a cathode ray oscillograph.

While some embodiments of the invention have been given by way of example, many variations of detail may be made therein without departing from the scope and spirit of the invention and other embodiments falling within the scope of the appended claims will occur to those skilled in the art.

Furthermore, while the invention has been described for radio direction finding purposes, it is also applicable to systems for automatically indicating the polarisation of incoming electromagnetic waves, and automatically indicating the direction of sound waves by utilising suitable sound wave pickups and energy converting devices such as microphones.

What is claimed is:

1. A radio direction finding system comprising a directional antenna system and an omni-directional antenna system for receiving transmitted waves, the amplitude of the output of the directional antenna system depending upon the angular relation between its directional pattern and the direction of propagation of the received waves, a source of low frequency waves, means for amplitude modulating the output from the directional antenna system with said low frequency waves comprising a pair of valves symmetrically arranged as a self-oscillating balanced modulator, means for combining only the side bands of the modulation products in phase quadrature with the output from the omni-directional antenna system to provide the phase modulated wave, a phase or frequency demodulator, means for applying the combined waves to said frequency or phase demodulator to obtain a wave corresponding to the phase modulation, means for utilizing said last-named wave to obtain the desired bearing information.

2. A radio direction finding system as claimed in claim 1 comprising a frequency changer, an intermediate frequency amplifier, an amplitude limiter, a frequency discriminator, a phase meter, means for applying said low frequency waves to said phase meter, means for applying the combined waves from the directional and non-directional antenna systems to said frequency changer, intermediate frequency amplifier, amplitude limiter and frequency discriminator and thence to said phase meter for comparison of the low frequency output with the waves applied from said source.

3. A radio direction finding system as claimed in claim 2 comprising a source of fixed stable frequency waves, arrangements for transferring said phase modulation to said fixed stable frequency for all values of operating frequencies.

4. A radio direction finding system as claimed in claim 3 wherein said source of stable frequency waves having a frequency F, said arrangements comprising a first modulator, means for applying the output from said stable source and the phase modulated waves at frequency $f$ to said first modulator, a first filter, means for feeding the output of said first modulator to said first filter which passes one of the side bands $(f-F)$ or $(f+F)$, a second modulator, means for feeding a portion of the phase modulated waves at frequency $f$ and the output from said first filter at frequency $(f-F)$ or $(f+F)$ to said second modulator, a second filter designed to pass frequency F, and a frequency or phase discriminator designed to operate at frequency F, means for applying the output at frequency F from said second filter to said frequency or phase discriminator.

CHARLES WILLIAM EARP.

REFERENCES CITED

The following references are of record in the file of this patent:

UNITED STATES PATENTS

| Number | Name | Date |
|---|---|---|
| 2,190,787 | Hooven | Feb. 20, 1940 |
| 2,284,475 | Plebanski | May 26, 1942 |
| 2,403,727 | Loughren | July 9, 1946 |
| 2,405,203 | Goldstein | Aug. 6, 1946 |
| 2,449,553 | Hansel | Sept. 21, 1948 |